Patented June 11, 1940

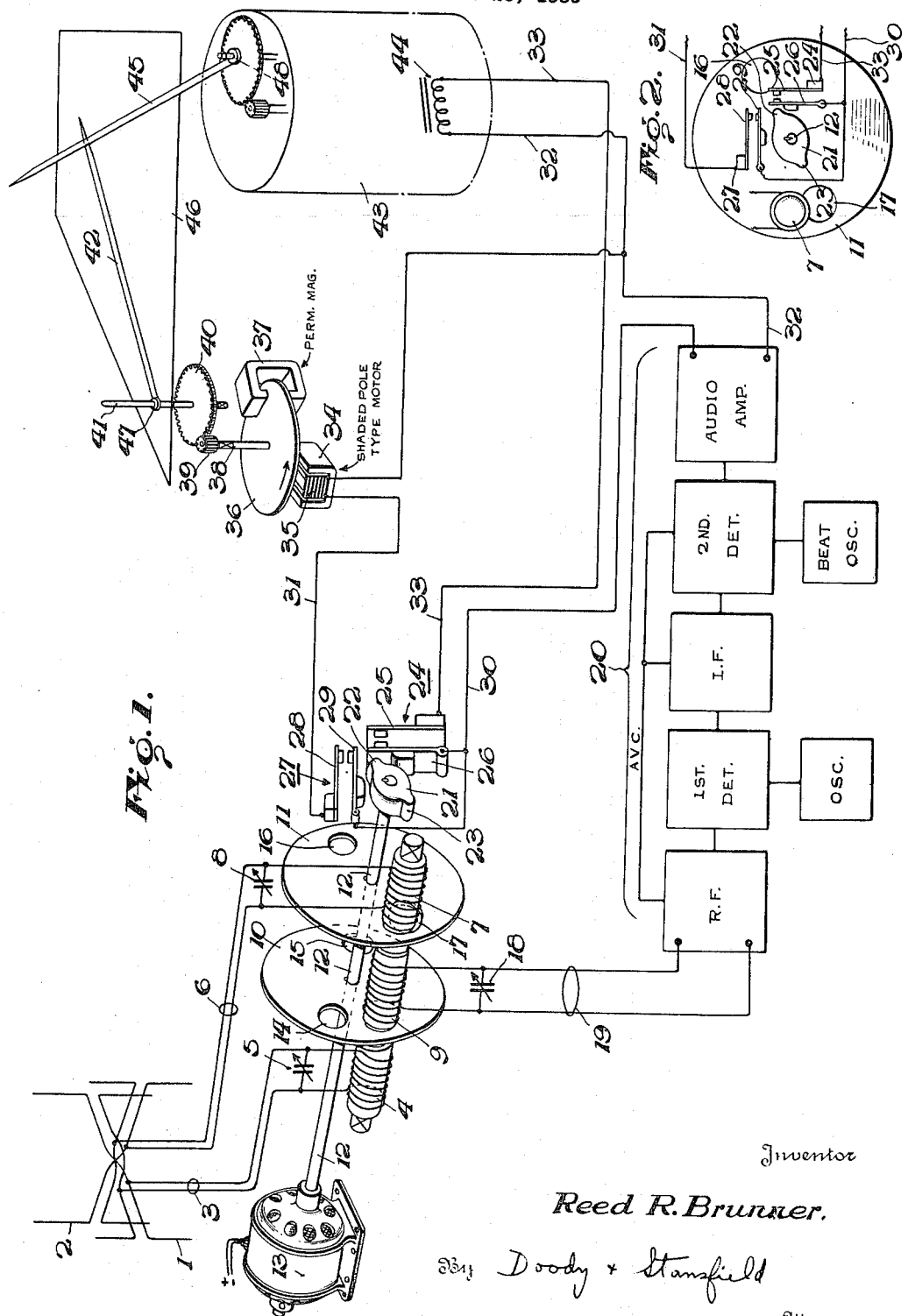

2,204,206

UNITED STATES PATENT OFFICE 2,204,206

DIRECTION FINDING APPARATUS

Reed R. Brunner, Chevy Chase, Md., assignor to United Air Lines Transport Corporation, Chicago, Ill., a corporation of Delaware Application February 25, 1939, Serial No. 258,509

8 Claims. (Cl. 250—11)

This invention relates to direction finding systems and more particularly to a system in which directional radio receiving apparatus may be employed to indicate the true bearing of a transmitting station with a relatively high degree of accuracy.

The phenomena accompanying the propagation of short waves, say 4 to 20 megacycles, frequently cause direction finding of reasonable accuracy to become a difficult problem. A direction finding station may receive directly a ground wave, a reflected sky wave, a scattered wave, or any combination of the three types. The ground wave is radiated along the surface of the earth, having a range of about 100 miles for the frequency of 4 megacycles, and a range of about 15 miles at the 20 megacycle frequency. A sky wave is transmitted energy which has been reflected from one of the several reflecting layers of the ionosphere and may have a useful range of many thousands of miles for direction finding purposes. Scattered waves are long range energy appearing to originate directionally at a false source in the case of a directional transmitter, and in the case of a non-directional transmitter the scattered waves are likewise non-directional and might reach the receiver from any direction in which the conditions are favorable for the reception of the particular frequency employed. These waves appear to be re-radiated from so called scatter sources formed in the lower layer of the ionosphere by the incidence of the transmitted wave upon the layer. As an extreme illustration, New York may not be able to contact London on the frequency of 11 megacycles, while London and Buenos Aires may have good communication on this frequency. Under these circumstances, it is entirely possible that a New York direction finder station may receive the London-Buenos Aires signal from a scatter source located somewhere along this route or even beyond Buenos Aires. If there is a directional beam transmission, the scatter source will remain constant in direction from New York even over a number of observations, and an erroneous London bearing will be repeatedly obtained. If the London transmission is non-directional in this instance, there will be numerous scatter sources, each fading intermittently to produce an apparent London bearing which shifts continually in accordance with the peak signal strength emanating from the various sources and no satisfactory bearing can be taken. Usually there is a combination of reflected sky waves and scattered waves to contend with, the former providing a true bearing and the latter providing false bearings which may shift through an angle of some thirty degrees. The problem is then to distinguish the true from the false bearings and the invention to be described provides a novel and improved means for accomplishing this result.

It is an object of this invention, therefore, to provide a new and novel radio direction finding apparatus which is more accurate in indication and simple in operation.

Another object is to provide apparatus of the above type in which a plurality of directional bearings may be taken and an averaged resultant value is indicated.

Still another object is to provide novel direction finding apparatus which automatically takes repeated bearing observations at high speed and supplies an average bearing indication by means of an indicating instrument of the current summation or integrating type.

Other objects and advantages will in part be specifically stated and in part be obvious when the following specification is read in conjunction with the drawing, in which:

Fig. 1 is a view of the invention partly diagrammatic and partly in perspective.

Fig. 2 is an end view in elevation of the inductance commutator employed in the invention.

Referring in more detail to Fig. 1, the reference numerals 1 and 2 indicate a pair of crossed Adcock directional antennae, each positioned at 90° with respect to the other and so oriented with respect to a desired transmitter that its signals are received on each of the pair of antennae with substantially equal amplitude. Preferably, the entire antenna system is mounted to be rotatable as a unit to afford ready orientation in any direction. While the Adcock type of antennae are incorporated in the preferred embodiment of the invention, any antenna arrangement which can provide two angularly displaced directive field patterns may be employed. A transmission line 3 couples the antenna structure 1 to a coil 4 which is bridged by a variable tuning condenser 5. Similarly, the other antenna structure 2 is coupled by a transmission line 6 to a coil 7, which is bridged by a variable tuning condenser 8.

The coils 4 and 7 are included in an inductance type of commutating device which is illustrated in a simplified form in order that the operation may be more readily comprehended. It will be noted that the antennae coils 4 and 7 are arranged in axial alignment with an intervening pickup coil 9, which is connected to the input terminals of a radio receiver of well known type.

A commutator disk 10 of metal is interposed between the antenna coil 4 and the pickup coil 9, and a second commutator disk 11 is placed between the pickup coil 9 and the other antenna coil 7. The disks 10 and 11 are fixed to a shaft 12 which is rotated by an electric motor 13. The disk 10 has circular apertures 14 and 15 located near the periphery thereof and centered on a diameter. The disk 11 has similar apertures 16 and 17 centered on a diameter at right angles with respect to the diameter of disk 10 on which apertures 14 and 15 are centered. As stated before, the coils 4, 9, and 7 are spaced in axial alignment, and the disks 10 and 11 are suitably supported so that their respective apertures will pass through the common axis of the coils. Mutual coupling between the antenna coil 4 and pickup coil 9 exists only during the transit times of the apertures 14 and 15 across the common coil axis, and a similar relation exists between antenna coil 7 and pickup coil 9 through the agency of the apertures 16 and 17 of disk 11. Thus at intervals corresponding to 90 degrees of rotation of the disks, the pickup coil 9 is coupled alternately to the antenna systems 1 and 2. A variable tuning condenser 18 resonates the pickup coil 9 and leads 19 connect it across the input of a radio receiver 20 shown in block diagram. The receiver should have an automatic volume control system with a fairly flat characteristic and a time constant equal to or greater than the time of a 90° displacement of the disks 10 and 11. Also, the receiver should preferably have a beat oscillator for best results when weak signals are being received, although this is not absolutely essential to insure correct operation of the invention. It will be understood that adequate shielding against undesired coupling is required for the various coils and transmission lines in conformance with general practice.

Positioned at one end of the inductance commutator structure is a switching mechanism which distributes the output of the receiver 20 between two channels in accordance with the alternate antenna inputs. For clearness in illustration, a showing of a casing and a supporting base plate has been omitted. The switching mechanism comprises two periodic switches operated sequentially in timed relation with the commutator disks 10 and 11. A cam having two lobes 22 and 23 is mounted on the commutator shaft 12. A switch 24 of the type ordinarily used in automobile ignition timers is positioned adjacent the cam 21, and consists of a stationary contact 25 together with a movable contact 26 which is operated by the cam lobes 22 and 23. Positioned adjacent the cam is a second switch 27 of similar type in a 90 degree angular relation with the switch 24. The switch 27 has a stationary contact 28 and a movable contact 29 operated by the cam 21. A lead 30 connects the movable contacts 26 and 29 to an output terminal of the receiver 20. Stationary contact 28 of switch 27 is connected by a lead 31, through an operating coil 35 of the indicator later to be described in detail and a return lead 32 with the other output terminal of receiver 20. The stationary contact 25 of switch 24 is connected by lead 33, through a second operating coil 44 of the above mentioned indicator to the return lead 32. Thus it may be seen that the receiver output is distributed between two channels, one channel carrying only the output current resulting from the input energy supplied by the antenna system 1, and the other channel carrying output current resulting from the input energy supplied by the antenna system 2.

The indicator essentially comprises means for comparing the output currents carried by the two channels over a period of time and providing a continuous individual summation of the current in each channel whereby an indication based on the ratio between the separate summated current values may be obtained. A cross pointer type instrument having constituent parts similar to an integrating type of watt-hour meter is incorporated in the preferred embodiment of the invention. There is a shaded pole type of induction motor having a stator element 34, a coil winding 35, and a metallic disk rotor element 36. A brake 37 comprising a permanent magnet is provided, with the periphery of the rotor disk 36 located in the air gap between the magnet poles. Extending axially from the rotor disk 36 is a shaft 38, carrying a pinion 39. A gear wheel 40 is meshed with the pinion 39, and carries an axial post 41 to which is secured an indicating pointer 42. The winding 35 is included in the output channel comprising switch 27, lead 31, winding 35, and return lead 32. In the arrangement as shown in Fig. 1, the pointer 42 is responsive to receiver output current resulting from the antenna system 1. Indicated generally as 43 is a device identical with that just described with the exception that the direction of rotation is reversed. A winding 44, indicated diagrammatically, is included in the output channel comprising switch 24, lead 33, winding 44, and return lead 32. The device 43 has a pointer 45 of sufficient length to cross the pointer 42. Underlying the pointers 42 and 45 is a scale member 46, which may be calibrated in terms of ratios, or in the preferred form, in terms of angular deviation from a centrally positioned zero bearing line. Thus a secondary, or vernier, bearing indication is provided to supplement the primary indication provided by the orientation in azimuth of the antenna array. It will be apparent that pointer 45 responds to receiver output current resulting from an antenna input supplied by the antenna system 2. The intersection of the pointers at any moment indicates the ratio between the energies received on the antenna systems 1 and 2, which is a function of the signal bearing. As the pointers move upwardly over the scale, the continuing integration of energies results in an increasingly accurate over all ratio, or bearing, indication. The pointer 42 is attached to the shaft 41 by means of a friction clutch device 47, and a similar friction clutch 48 is provided for the pointer 45. The clutches allow the pointers to be quickly set in their starting positions adjacent the lower edge of the scale 46 without the necessity of rotating the associated armature disks.

While the apparent bearing of a transmitting station may swing rapidly from points as much as 30° on either side of the true bearing through the agency of propagation effects earlier mentioned, an average value of these bearings, when taken over a period of several minutes will usually provide a true bearing of plus or minus accuracy 2 to 4 degrees depending on conditions of reception. The speed of travel of the pointers 42 and 45 may be regulated by manipulation of the manual gain control associated with the receiver 20 and which controls the output thereof. In this way the length of the period of taking bearings may be controlled to suit existing conditions, with the accuracy of the resultant bearing increasing with the length of the period.

It will be apparent that many alternative forms of directional antennae may be employed with the invention to provide the necessary angularly displaced directive patterns. Among such are: loop antennae arranged so that their planes intersect, the combination of a directional and a non-directional antenna with accompanying means for obtaining reversal of the cardioid characteristic, or means for oscillating a unidirectional antenna through an arc of rotation and utilizing the end points of the arc for intervals of reception.

Other forms of integrating devices may similarly be used in the indicator to summate the increments of output energy. As an illustration, the successive increments may be stored in condensers individual to each output channel, with means providing an indication of the state of charge of each condenser.

Many changes and modifications may be made by anyone skilled in the art without departing from the spirit and scope of the invention as expressed in the following claims.

What is claimed is:

1. In radio direction finding apparatus, antenna means capable of directional receptivity in at least two directions, a radio receiver, means for coupling said receiver to said antenna means to provide input energies alternately in accordance with said directional receptivities, means connected to the output of said receiver for separately integrating the two received energies over a period of time and means for indicating a comparison between the integrated energies.

2. In radio direction finding apparatus, antenna means capable of directional receptivity in at least two directions, a radio receiver, means for coupling said receiver to said antenna means to provide input energies alternately in accordance with said directional receptivities, current responsive means connected to the output of said receiver for separately integrating the two received energies over a period of time, and means for providing an indication in accordance with the ratio between the received energies.

3. In radio direction finding apparatus, antenna means capable of directional receptivity in at least two directions, a radio receiver, means for coupling said receiver to said antenna means to provide input energies alternately in accordance with said directional receptivities, means connected to the output of said receiver for effecting a separate summation of output currents resulting from each of said respective input energies, and indicating means operated by said summating means.

4. In radio direction finding apparatus, antenna means capable of directional receptivity in at least two directions, a radio receiver, means for coupling said receiver to said antenna means to provide input energies alternately in accordance with said directional receptivities, means connected to the output of said receiver for effecting a separate summation of output currents resulting from each of said respective input energies, and indicating means responsive to said summating means and operative during the entire period of summation.

5. In radio direction finding apparatus, antenna means capable of directional receptivity in at least two directions, a radio receiver, means for coupling said receiver to said antenna means to provide input energies alternately in accordance with said directional receptivities, means connected to the output of said receiver for effecting a separate summation of output currents resulting from each of said respective input energies, and indicating means providing a comparison of said summated output currents.

6. In radio direction finding apparatus, antenna means capable of directional receptivity in at least two directions, a radio receiver, means for coupling said receiver to said antenna means to provide input energies alternately in accordance with said directional receptives, means connected to the output of said receiver for effecting a separate summation of output currents resulting from each of said respective input energies, and indicating means providing a progressive comparison of said output currents during the period of summation.

7. In radio direction finding apparatus, a source of signals, two directional antennae, a radio receiver having means to produce an alternating current output, means for alternately coupling said antennae to said receiver, switch means connected to the output of said receiver and operated in timed relation with respect to said coupling means, and means connected with said switch means for integrating the output of said receiver and indicating the ratio between the energies received by each antenna from said signal source.

8. In radio direction finding apparatus, a source of signals, two directional antennae, a radio receiver having means to produce an alternating current output, means for alternately coupling said antennae to said receiver, an indicator including a pair of current integrating means, a circuit connected to each of said integrating means, and switch means connected to the output of said receiver and operated conjointly with said antennae coupling means to alternate the output of said receiver between said circuits.

REED R. BRUNNER.

CERTIFICATE OF CORRECTION.

Patent No. 2,204,206. June 11, 1940.

REED R. BRUNNER.

It is hereby certified that error appears in the printed specification of the above numbered patent requiring correction as follows: Page 3, second column, line 26, claim 6, for "receptives" read --receptivities--; and that the said Letters Patent should be read with this correction therein that the same may conform to the record of the case in the Patent Office.

Signed and sealed this 13th day of August, A. D. 1940.

(Seal)

Henry Van Arsdale,
Acting Commissioner of Patents.